United States Patent [19]

Burnett

[11] Patent Number: 4,631,828

[45] Date of Patent: Dec. 30, 1986

[54] CUTTING MEANS FOR ROTARY TRIMMER

[76] Inventor: Robert J. Burnett, Rte. #1, Box 73, Suches, Ga. 30572

[21] Appl. No.: 746,782

[22] Filed: Jun. 20, 1985

[51] Int. Cl.⁴ .............................................. A01G 3/06
[52] U.S. Cl. .................................... 30/276; 56/12.7; 30/347
[58] Field of Search ............... 30/276, 381, 382, 347; 56/12.7

[56] References Cited

U.S. PATENT DOCUMENTS

| | | | |
|---|---|---|---|
| 485,888 | 11/1892 | Schollenberger | 30/274 |
| 2,447,298 | 8/1948 | Whitlock | 30/382 |
| 2,545,590 | 3/1951 | Settergren | 56/12.7 X |
| 2,676,448 | 4/1954 | Limberger | 56/12.7 |
| 3,157,015 | 11/1964 | Russell | 56/12.7 |
| 4,148,141 | 4/1979 | Hoff | 30/276 |

Primary Examiner—Jimmy C. Peters
Attorney, Agent, or Firm—James B. Middleton

[57] ABSTRACT

An improved cutting member for a rotary trimmer. The cutting member is formed of a flat link chain, so the cutting member is flexible throughout its length. Alternate links are somewhat wider, and may be sharpened on their edges for better cutting. A hardened wear member is at the ends of the cutting member both to receive the hard wear of cutting against hard surfaces and to provide a more massive end to assist in holding the cutting member out during operation.

1 Claim, 5 Drawing Figures

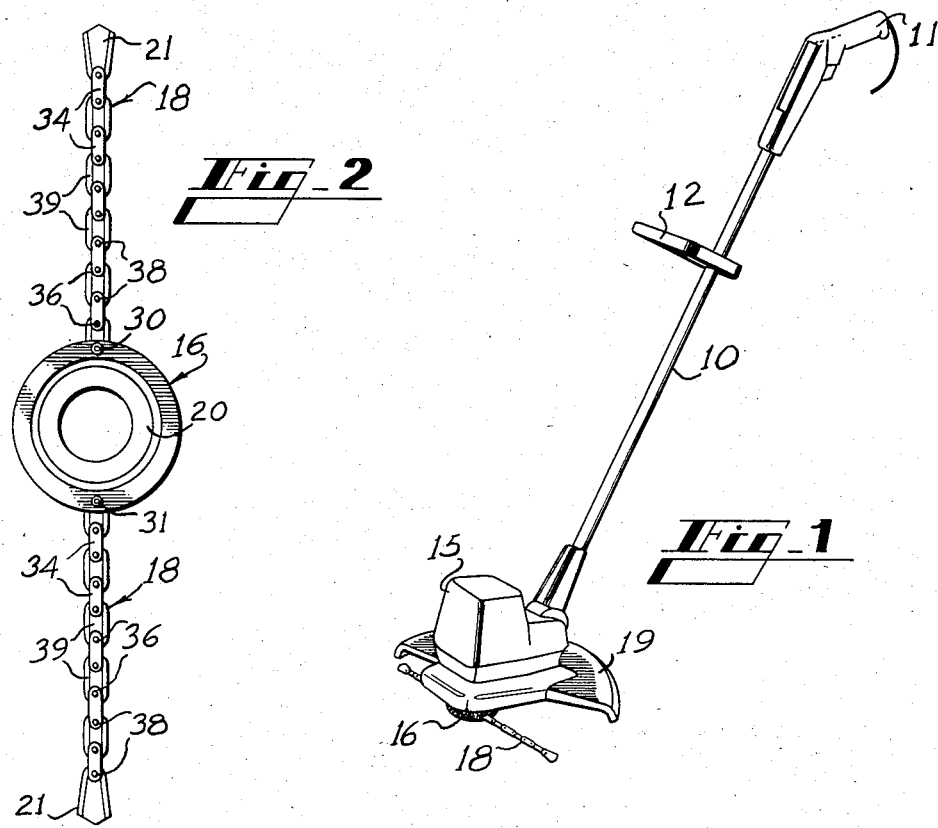
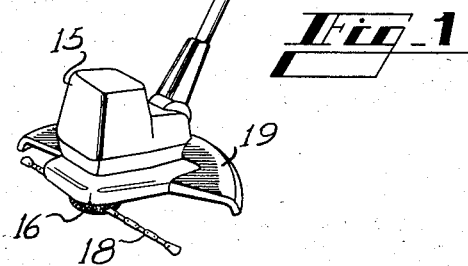
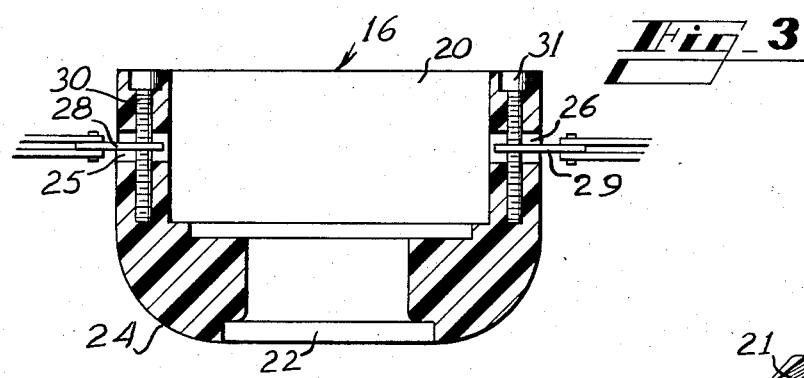
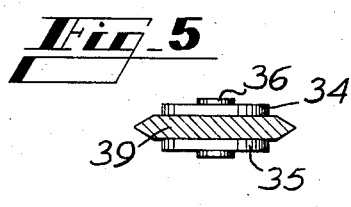
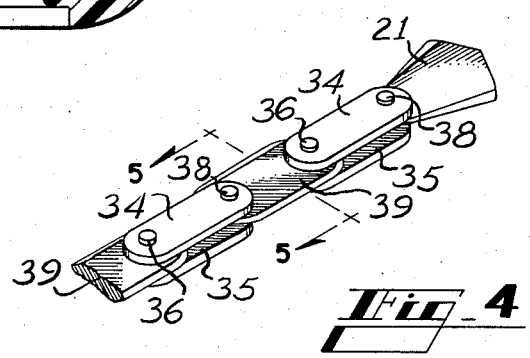

CUTTING MEANS FOR ROTARY TRIMMER

INFORMATION DISCLOSURE STATEMENT

Rotary cutters, or trimmers are well known in the art, and include a wide variety of apparatus. Currently, there is a very popular form of trimmer having an elongated support member that is held and manipulated by a person, the rotary cutting means being relatively small for easy manipulation in close areas, around obstacles and the like. These rotary trimmers may be electrically drive, in which case an electric motor is generally supported by the elongated support means, and the cutting means is generally driven directly fron the motor shaft. Alternatively, the trimmer may be powered by a combustion engine, in which case the combustion engine is mounted at the upper end of the elongated support member, and a flexible drive shaft or the like extends through the support member for driving the rotary cutter at the lower end.

These rotary trimmers most often utilize a string or the like, usually a mono-filament nylon line as the cutting means, the line being simply replaced, or fed from a self contained reel, when the line breaks or wears out. For cutting heavier brush and the like with these trimmers, the line is normally replaced with a rigid steel circular saw blade. It has been found, however, that there are many situations in which nylon line is too light to cut growing material, but the growing material is not sufficiently stiff to be cut by a circular saw blade. There is therefore a need for an improved cutting member for use on rotary trimmers and the like.

SUMMARY OF THE INVENTION

This invention relates generally to mowing or trimming apparatus, and is more particularly concerned with an improved cutting member for use on a rotary trimmer or the like.

The present invention provides a flexible cutting member for use on a rotary trimmer, the flexible cutting member being more durable and more aggressive than the usual nylon line or the like while retaining the flexibility for cutting against fixed obstacles and the like. In the preferred embodiment of the invention, the cutting member comprises a link chain having alternate, flat links extending outwardly and having sharpened edges. The end of the chain may include a wear member for longer life of the cutting member. The cutting member is pivotally attached to a hub which is mounted in conventional fashion on the driving member of the trimmer.

BRIEF DESCRIPTION OF THE DRAWINGS

These and other features and advantages of the present invention will become apparent from consideration of the following specification when taken in conjunction with the accompanying drawings in which:

FIG. 1 is a perspective view of a conventional trimmer having the cutting member of the present invention mounted thereon;

FIG. 2 is a top plan view of a hub having cutting members made in accordance with the present invention;

FIG. 3 is an enlarged cross-sectional view taken through the hub shown in FIG. 2;

FIG. 4 is an enlarged perspective view showing one end of the cutting member; and, FIG. 5 is a cross-sectional view taken substantially along the line 5—5 in FIG. 4.

DETAILED DESCRIPTION OF THE EMBODIMENT

Referring now more particularly to the drawings, and to that embodiment of the invention here presented by way of illustration, the device shown in FIG. 1 includes the elongated supporting member 10 having a handle 11 at the upper end thereof. A yoke 12 is provided below the handle to allow easy control of the device.

The lower end of the support member 10 carries the engine 15 and the drive hub 16 from which the flexible cutting members 18 extend. For protection of the user, a safety shield 19 contains the cutting member on the side towards the operator.

Those skilled in the art will realize that the arrangement shown in FIG. 1 is quite conventional, the exception being in the specific cutting member 18. It is contemplated that the present invention will be made in such sizes that the cutting member can be mounted on existing drive members with no modification of the trimmer itself.

Looking now at FIG. 2 of the drawings, it will be seen that the hub 16 includes a central opening 20 for receiving the drive member of the trimmer. Cutting members 18 extend diametrically oppositely from the hub 16, and it will be noted that the cutting members 18 comprise lengths of link chain, and terminate in wear members 21.

Looking now more particularly at FIG. 3 of the drawings, the hub 16 is shown in cross-section, and it will be seen that the central opening 20 has a bolt hole 22 in communication therewith. Those skilled in the art should understand that the bolt hole 22 is illustrated by way of example, each trimmer having some means for fastening a hub such as the hub 16 thereto. One conventional fastening arrangement includes a hole such as the bolt hole 22 to receive a bolt which threads into the drive shaft of the trimmer.

The lower surface of the hub 16 is here shown as substantially spherical. While any desired shape may serve, the smooth surface 24 will glide easily over lawns and the like without destroying the grass or other desired plants.

For fastening the cutting members 18 to the hub 16, it will be seen in FIG. 3 that the hub 16 defines opposed slots 25 and 26. Each slot 25 and 26 is of a size and shape to receive the innermost links 28 and 29 of cutting members 18, and to allow some freedom of motion of the links 28 and 29 within the slots 25 and 26.

To retain the links 28 and 29 within the slots 25 and 26, and to allow the desired pivoting motion, there are screws 30 and 31 received in appropriate openings that intersect the slots 25 and 26. It will be understood that the chain links 28 and 29 have holes at their inner ends, and the screws 30 and 31 pass through these holes. The cutting members 18 are therefore held securely to the hub 16, and are pivotally supported.

Attention is now directed to FIGS. 4 and 5 of the drawings for a detailed description of the cutting members 18. Those skilled in the art will realize that the cutting members 18 comprise, generally, lengths of link chain. The conventional link chain is formed of flat links having holes in each end, and successive links are pivotally held together by pins. The link chain, or cutting member 18, is formed in much the same way as a conventional chain, with some modifications.

Specifically, the cutting member 18 shown in FIGS. 4 and 5 includes pairs of links designated at 34 and 35. As here illustrated the links 34 are on the top, and the links 35 are on the bottom. Each end of the links 34 and 35 defines a hole for receiving a pin, such as the pins 36 and 38. A pin 36 passes through one end of the links 34 and 35, and a pin 38 passes through the opposite end of the links 34 and 35.

Interspersed with the pairs of links 34 and 35, there are single links 39. The links 39 also have holes in each end, and each end of a link 39 is between two links 34 and 35 with a common pin passing through all three links. Thus, a single pin 36 passes through one end of a link 34, one end of a link 39, and one end of a link 35. The adjacent pin 38 passes through the opposite end of the same link 34, through one end of the next link 39, then through the opposite end of the same link 35.

Because of the above described cvonstruction, it will be understood that the link chain, or cutting member 18, is highly flexible, being easily pivotal at each pin 36 and 38. Because of the parallel links 34 and 35, however, the cuttng member has some degree of rigidity in the vertical direction.

With especial attention to FIG. 5 of the drawings, it will be seen that the links 39 are wider than the links 34 and 35, and have their outermost edges sharpened. It is therefore primarily the links 39 that cut during use of the cuting members 18.

It should be understood that, for the most effective cutting, the cutting members 18 should extend outwardly. When using the conventional nylon line, only the weight of the line is relied on, as acted on by centrifugal force. In the present invention, however, the outermost ends of the cutting members carry wear members 21. While one function of the wear members 21 is to provide a relatively durable member that can withstand the beating against metal, stone and the like, the wear members 21 also provide an increased mass at the ends of the members to increase the moment of inertia. This also moves the point of maximum impact outwardly for more efficient use of the power in cutting vegetation.

Operation of the device should be understandable in view of the foregoing description. The hub 16 will be formed in such fashion that the hub 16 can be installed on the drive member of a conventional rotary trimmer or the like. Link chains having the described link structure will be assembled with the proper, or desired, length, terminating in a wear member 21, the wear members preferably being formed of a tough, wear resistant steel or the like. Thus, when the trimmer is operated in conventional fashion, the cutting members 18 will be held out, substantially diametrically of the hub 16, by centrifugal force. As the cutting members 18 engage vegetation, the vegetation will be cut as is usual. An important difference in the use of the present invention is that the cutting members 18 are sufficiently aggressive that they will cut quite woody brush and the like very efficiently. Small trees and similar material are cut very easily, and larger trees can be cut with the cutting members 18, though more time may be required.

Unlike the conventional saw blade mountable on rotary trimmers, the present cutting members do not bind, or push material aside without cutting. The present cutting members are therefore very versatile in their ability. It will of course be realized that other specific forms of chain may be used, for example the pairs of links may be sharpened rather than the single links, serrated cutting edges may be provided, and other changes will suggest themselves to those skilled in the art.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. In combination, a trimmer comprising a support member, an engine carried on said support member, and a hub carried on said support member and drivingly connected to said engine so that operation of the said engine causes rotation of said hub, a plurality of flexible cutting members carried by said hub and extending in diametrically opposite directions therefrom, said trimmer being so constructed and arranged that said hub is normally horizontal and rotates about a vertical axis so that said cutting members operate in a generally horizontal plane, each cutting member of said plurality of cutting members comprising a link chain including a plurality of single flat links and a plurality of pairs of flat links, said plurality of pairs of flat links alternating with said plurality of single flat links throughout the length of said cutting member, a plurality of pins, each pin of said plurality of pins connecting one end of one of said pairs of flat links to one end of one of said single flat links, said flat links being generally horizontal with said pins vertically disposed so that said link chain is flexible in a horizontal plane, each link of said plurality of single links having a greater width than the links of said pairs of links for defining a plurality of cutting edges, each cutting edge of said plurality of cutting edges being sharpened, a plurality of wear members, each wear member of said plurality of wear members being pivotally carried at the extending end of one of said cutting members and having a mass greater than the mass of one of said single links, means for pivotally fixing said cutting members to said hub in a single horizontal plane, said hub defining a smooth convex lower surface for preventing damage to vegetation engaged by said hub.

* * * * *